US012016041B2

(12) United States Patent
Tsai et al.

(10) Patent No.: US 12,016,041 B2
(45) Date of Patent: *Jun. 18, 2024

(54) METHOD AND APPARATUS FOR PDCCH MONITORING ADAPTATION

(71) Applicant: FG Innovation Company Limited, Tuen Mun (HK)

(72) Inventors: Hsin-Hsi Tsai, Taipei (TW); Chia-Hung Wei, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,686

(22) Filed: Sep. 20, 2022

(65) Prior Publication Data
US 2023/0015820 A1 Jan. 19, 2023

Related U.S. Application Data

(63) Continuation of application No. 16/986,184, filed on Aug. 5, 2020, now Pat. No. 11,582,784.
(Continued)

(51) Int. Cl.
*H04W 72/23* (2023.01)
*H04L 5/00* (2006.01)
(Continued)

(52) U.S. Cl.
CPC .............. *H04W 72/23* (2023.01); *H04L 5/001* (2013.01); *H04L 5/0098* (2013.01);
(Continued)

(58) Field of Classification Search
CPC ..... H04W 24/10; H04W 76/27; H04W 76/28; H04W 72/23; H04L 5/0098; H04L 5/001
(Continued)

(56) References Cited

U.S. PATENT DOCUMENTS 11,582,784 B2 * 2/2023 Tsai .................... H04W 72/23
2019/0103954 A1 4/2019 Lee et al.
(Continued)

FOREIGN PATENT DOCUMENTS

CN   105917607 A   8/2016
CN   106233805 A   12/2016
(Continued)

OTHER PUBLICATIONS

3GPP TS 38.300, "3rd Generation Partnership Project; Technical Specification Group Radio Access Network; NR; NR and NG-RAN Overall Description; Stage 2 (Release 15)", V15.5.0 (Mar. 2019).
(Continued)

*Primary Examiner* — Peter G Solinsky
(74) *Attorney, Agent, or Firm* — ScienBiziP, P.C.

(57) ABSTRACT

A method performed by a User Equipment (UE) includes receiving, through Radio Resource Control (RRC) signaling from a Base Station (BS), an indication indicating a dormancy cell group having at least a first serving cell and a second serving cell, receiving, through Physical Layer (PHY) signaling from the BS, a signal associated with a specific Downlink Control Information (DCI) format indicating a dormant behavior applicable to all serving cells in the dormancy cell group, wherein the signal indicates the dormant behavior via a single bit, applying the dormant behavior to the first serving cell and the second serving cell when the signal indicates that the dormant behavior is to be activated, and not applying the dormant behavior to the first serving cell and the second serving cell when the signal indicates that the dormant behavior is to be deactivated.

16 Claims, 5 Drawing Sheets

Related U.S. Application Data

(60) Provisional application No. 62/885,399, filed on Aug. 12, 2019.

(51) Int. Cl.
  *H04W 24/10* (2009.01)
  *H04W 76/27* (2018.01)
  *H04W 76/28* (2018.01)

(52) U.S. Cl.
  CPC ............ *H04W 24/10* (2013.01); *H04W 76/27* (2018.02); *H04W 76/28* (2018.02)

(58) Field of Classification Search
  USPC ......................................................... 370/329
  See application file for complete search history.

(56) References Cited

U.S. PATENT DOCUMENTS

| | | | |
|---|---|---|---|
| 2019/0132109 A1 | 5/2019 | Zhou et al. | |
| 2019/0159126 A1 | 5/2019 | Kadiri et al. | |
| 2019/0166631 A1 | 5/2019 | Park et al. | |
| 2019/0200413 A1 | 6/2019 | Hong | |

FOREIGN PATENT DOCUMENTS

| | | |
|---|---|---|
| CN | 108496385 A | 9/2018 |
| CN | 109474401 A | 3/2019 |
| CN | 109496447 A | 3/2019 |
| CN | 109561472 A | 4/2019 |
| CN | 109923919 A | 6/2019 |
| CN | 109996338 A | 7/2019 |
| CN | 110073704 A | 7/2019 |
| IN | 201741031876 A | 3/2019 |

OTHER PUBLICATIONS

3GPP TS 38.321, "3rd Generation Partnership Project; Technical Specification Group Radio Access Network; NR; Medium Access Control (MAC) protocol specification (Release 15)", V15.5.0 (Mar. 2019).

3GPP TS 38.213, "3rd Generation Partnership Project; Technical Specification Group Radio Access Network; NR; Physical layer procedures for control (Release 15)", V15.5.0 (Mar. 2019).

3GPP TS 38.331, "3rd Generation Partnership Project; Technical Specification Group Radio Access Network; NR; Radio Resource Control (RRC) protocol specification (Release 15)", V15.5.0 (Mar. 2019).

\* cited by examiner

METHOD AND APPARATUS FOR PDCCH MONITORING ADAPTATION

CROSS-REFERENCE TO RELATED APPLICATION(S)

The present application is a continuation application of U.S. patent application Ser. No. 16/986,184, filed on Aug. 5, 2020, which claims the benefit of and priority to U.S. Provisional Patent Application Ser. No. 62/885,399 filed on Aug. 12, 2019. The contents of all above-identified applications are hereby incorporated herein fully by reference for all purposes.

FIELD

The present disclosure generally relates to wireless communication, and more particularly, to Physical Downlink Control Channel (PDCCH) monitoring and adaptation in next generation wireless communication networks.

BACKGROUND

In Carrier Aggregation (CA), two or more Component Carriers (CCs) are aggregated. A User Equipment (UE) may simultaneously receive or transmit on one or multiple CCs depending on its capabilities. CA is supported for both contiguous and non-contiguous CCs. When CA is deployed, frame timing and System Frame Number (SFN) are aligned across cells that can be aggregated. In the case of multiple CCs, the maximum number of configured CCs for a UE may be sixteen for Downlink (DL) transmission, and sixteen for Uplink (UL) transmission.

To enable Bandwidth Adaptation (BA) on the PCell, the gNB configures the UE with UL and DL Bandwidth Part(s) (BWPs). To enable BA on Secondary Cells (SCells) in the case of CA, the gNB configures the UE with DL BWP(s) at least (i.e., there may be none in the UL). For the PCell, the initial BWP is the BWP used for initial access. For the SCell(s), the initial BWP is the BWP configured for the UE to first operate at SCell activation. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a BWP and BA is achieved by configuring the UE with BWP(s) and telling the UE which of the configured BWPs is currently the active one.

A UE configured for operation in BWPs of a serving cell, is configured by higher layers for the serving cell. A set of at most four BWPs for UE reception (the DL BWP set) are identified in a DL bandwidth by the parameter BWP-Downlink, and a set of at most four BWPs for UE transmission (the UL BWP set) are identified in an UL bandwidth by the parameter BWP-Uplink. Each DL BWP of the cell may or may not be configured with a PDCCH configuration (i.e., the configuration of the PDCCH for the BWP is optional).

To enable reasonable UE battery consumption when CA is configured, an activation/deactivation mechanism of Cells is supported. When an SCell is deactivated, the UE does not need to receive the corresponding PDCCH or Physical Downlink Shared Channel (PDSCH), cannot transmit in the corresponding uplink, nor is it required to perform Channel Quality Indicator (CQI) measurements. Conversely, when an SCell is active, the UE shall receive PDSCH and PDCCH configurations (if the UE is configured to monitor PDCCH on this SCell) and is expected to be able to perform CQI measurements.

A UE may be configured with a Discontinuous Reception (DRX) functionality that controls the UE's PDCCH monitoring activity. When using a DRX operation, the UE shall also monitor PDCCH according to requirements found in other subclauses of the 3GPP Medium Access Control (MAC) protocol specification. When in an RRC_CONNECTED state, if a DRX is configured, for all the activated Serving Cells, the UE may monitor the PDCCH discontinuously using the DRX operation specified in this subclause; otherwise the UE shall monitor the PDCCH as specified in the 3GPP Radio Resource Control (RRC) protocol specification.

Pursuant to the 3GPP New Radio (NR) and Next Generation Radio Access Network (NG-RAN) Overall Description (stage 2), when DRX is configured, the UE does not have to continuously monitor PDCCH. DRX is characterized by the following conditions:

on-duration: the duration that the UE waits, after waking up, to receive PDCCHs. If the UE successfully decodes a PDCCH, the UE stays awake and starts the inactivity timer;

inactivity-timer: the duration that the UE waits to successfully decode a PDCCH, from the last successful decoding of a PDCCH, failing which, it can go back to sleep. The UE shall restart the inactivity timer following a single successful decoding of a PDCCH for a first transmission only (i.e. not for retransmissions);

retransmission-timer: the duration until a retransmission can be expected;

cycle: specifies the periodic repetition of the on-duration followed by a possible period of inactivity;

active-time: the total duration that the UE monitors PDCCH. This includes the "on-duration" of the DRX cycle, the time the UE is performing continuous reception while the inactivity timer has not expired, and the time when the UE is performing continuous reception while waiting for a retransmission opportunity.

Pursuant to the 3GPP MAC protocol specification, when a DRX cycle is configured, the Active Time includes the time while:

drx-onDurationTimer or drx-InactivityTimer or drx-RetransmissionTimerDL or drx-RetransmissionTimerUL or ra-ContentionResolutionTimer (as described in 3GPP TS 38.321 V15.5.0 subclause 5.1.5) is running; or a Scheduling Request is sent on Physical Uplink Control Channel (PUCCH) and is pending (as described in 3GPP TS 38.321 V15.5.0 subclause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in 3GPP TS 38.321 V15.5.0 subclause 5.1.4).

The MAC entity does not need to monitor the PDCCH if it is not a complete PDCCH occasion (e.g., the Active Time starts or ends in the middle of a PDCCH occasion).

In carrier aggregation, SCells may be used to offload large data bursts, which can help increase UE's link throughput, but at the same time increase UE's power consumption. Therefore, to enable reasonable UE battery consumption when CA is configured, some methods may be applied by a network (NW). In one current method, the NW could deactivate the configured SCells by a SCell Activation/Deactivation MAC Control Element (CE). When the SCell is deactivated, the UE may not: transmit Sounding Reference Signal (SRS) on the SCell, report Channel State Information (CSI) for the SCell, transmit on uplink shared channel (UL-SCH) on the SCell, transmit on Random Access Channel (RACH) on the SCell, monitor the PDCCH on the SCell, monitor the PDCCH for the SCell, and/or transmit PUCCH on the SCell. However, for this alternative, although restricting most of the transmissions on the SCell could save a large amount of power, the drawback is a long delay for CQI measurement and/or CQI report at the beginning when the SCell is re-activated, which may degrade the efficiency.

In the current DRX mechanism (e.g., 3GPP Rel-15), when the UE is configured with DRX and the UE is in DRX Active Time, the UE may need to monitor PDCCH on each of the serving cells with a PDCCH configuration. It is well known that even if the UE is not scheduled with data on a SCell, a large percentage of power is spent on that cell for monitoring PDCCH on the cell. Therefore, it would be very useful if a UE can dynamically adapt its PDCCH monitoring on a SCell, e.g., based on its traffic load. In one current method, a NW could de-configure the PDCCH on the SCell. When the PDCCH configuration of the SCell is de-configured, the UE may not need to monitor the PDCCH on the SCell. If the NW would like to schedule the transmission on the SCell, the NW may signal the PDCCH via another cell for the SCell (e.g., based on cross-carrier scheduling). However, for this alternative, to reconfigure the RRC configuration is not time efficient, which may typically take a long time to change the configuration.

As a consequence, some enhancements for dynamically adapting PDCCH monitoring to reduce PDCCH monitoring on a specific serving cell(s) or a specific cell group may be beneficial for power saving.

SUMMARY

According to a first aspect of the present disclosure, a method performed by a UE configured with a plurality of serving cells is provided. The method includes receiving, through RRC signaling from a BS, an indication indicating a dormancy cell group having a first serving cell and a second serving cell of the plurality of serving cells. The UE also receives, from the BS, a first indicator indicating to the UE that a dormant behavior to the first serving cell of the dormancy cell group is to be activated when the first serving cell is activated, the dormant behavior including stopping monitoring a PDCCH of the first serving cell. The UE also receives, from the BS, a second indicator indicating to the UE that a dormant behavior to the second serving cell of the dormancy cell group is to be deactivated when the second serving cell is activated, the dormant behavior including stopping monitoring a PDCCH of the second serving cell. The UE also receives, through Media Access Control (MAC) signaling from the BS, a cell activation indication to activate the first serving cell and the second serving cell.

In an implementation of the first aspect, the first serving cell and the second serving cell are activated based on the cell activation indication, the dormant behavior to the first serving cell is applied based on the first indicator when the first serving cell is activated, and the dormant behavior to the second serving cell is not applied based on the second indicator when the second serving cell is activated.

In another implementation of the first aspect, the first indicator and the second indicator may each indicate an initial dormant behavior to be activated or deactivated when the corresponding first and second serving cells are activated. The UE may receive, from the BS, a wake up signal indicating a group dormant behavior of the dormancy cell group, the wake up signal further including power saving information, apply the dormant behavior to the first serving cell and the second serving cell when the wake up signal indicates the group dormant behavior for the dormancy cell group is to be activated, and not apply the dormant behavior to the first serving cell and the second serving cell when the wake up signal indicates the group dormant behavior of the dormancy cell group is to be deactivated.

In another implementation of the first aspect, the power saving information may include a PDCCH monitoring behavior within an on-duration time of a Discontinuous Reception (DRX) mechanism, and the wake up signal may indicate the group dormant behavior for all serving cells in the dormancy cell group via a single bit.

In another implementation of the first aspect, the method may also include receiving, through Physical Layer (PHY) signaling from the BS, a signal associated with a specific Downlink Control Information (DCI) format indicating a group dormant behavior of the dormancy cell group, wherein the signal indicates the group dormant behavior for all serving cells in the dormancy cell group via a single bit, applying the dormant behavior to the first serving cell and the second serving cell when the signal indicates the group dormant behavior of the dormancy cell group is to be activated, and not applying the dormant behavior to the first serving cell and the second serving cell when the signal indicates the group dormant behavior of the dormancy cell group is to be deactivated.

In another implementation of the first aspect, the method may include the dormant behavior further including at least one of performing CSI measurement, performing Automatic Gain Control (AGC), and performing beam management. The dormant behavior to the first serving cell may be applied on an active BWP of the first serving cell when the first serving cell is activated. The dormancy cell group may include only serving cells that are Secondary Cells (SCells), and the indication may indicate a serving cell of the plurality of serving cells belonging to the dormancy cell group to the UE via a cell index of the serving cell.

According to a second aspect of the present disclosure, a UE configured with a plurality of serving cells is provided. The UE includes one or more non-transitory computer-readable media having computer-executable instructions embodied thereon, and at least one processor coupled to the one or more non-transitory computer-readable media, and configured to execute the computer-executable instructions to receive, through RRC signaling from a base station (BS), an indication indicating a dormancy cell group having a first serving cell and a second serving cell of the plurality of serving cells; receive, from the BS, a first indicator indicating to the UE that a dormant behavior to the first serving cell of the dormancy cell group is to be activated when the first serving cell is activated, the dormant behavior including stopping monitoring a PDCCH of the first serving cell; receive, from the BS, a second indicator indicating to the UE that a dormant behavior to the second serving cell of the dormancy cell group is to be deactivated when the second serving cell is activated, the dormant behavior including stopping monitoring a PDCCH of the second serving cell;

and receive, through MAC signaling from the BS, a cell activation indication to activate the first serving cell and the second serving cell.

In another implementation of the second aspect, the first serving cell and the second serving cell are activated based on the cell activation indication, the dormant behavior to the first serving cell is applied based on the first indicator when the first serving cell is activated, and the dormant behavior to the second serving cell is not applied based on the second indicator when the second serving cell is activated.

In another implementation of the second aspect, the first indicator and the second indicator may each indicate an initial dormant behavior to be activated or deactivated when the corresponding first and second serving cells are activated. The at least one processor may be further configured to execute the computer-executable instructions to: receive, from the BS, a wake up signal indicating a group dormant behavior of the dormancy cell group, the wake up signal further including power saving information; apply the dormant behavior to the first serving cell and the second serving cell when the wake up signal indicates the group dormant behavior for the dormancy cell group is to be activated; and not apply the dormant behavior to the first serving cell and the second serving cell when the wake up signal indicates the group dormant behavior of the dormancy cell group is to be deactivated.

In another implementation of the second aspect, the power saving information may include a PDCCH monitoring behavior within an on-duration time of a DRX mechanism. The wake up signal indicates the group dormant behavior for all serving cells in the dormancy cell group via a single bit.

In another implementation of the second aspect, the at least one processor is further configured to execute the computer-executable instructions to: receive, through PHY signaling from the BS, a signal associated with a specific Downlink Control Information DCI format indicating a group dormant behavior of the dormancy cell group, wherein the signal indicates the group dormant behavior for all serving cells in the dormancy cell group via a single bit; apply the dormant behavior to the first serving cell and the second serving cell when the signal indicates the group dormant behavior of the dormancy cell group is to be activated; and not apply the dormant behavior to the first serving cell and the second serving cell when the signal indicates the group dormant behavior of the dormancy cell group is to be deactivated.

In another implementation of the second aspect, the dormant behavior may further include at least one of performing CSI measurement, performing AGC, and performing beam management. The dormant behavior to the first serving cell may be applied on an active BWP of the first serving cell when the first serving cell is activated. The dormancy cell group may include only serving cells that are Secondary Cells (SCells), and the indication may indicate a serving cell of the plurality of serving cells belonging to the dormancy cell group to the UE via a cell index of the serving cell.

According to a third aspect of the present disclosure, a method performed by a User Equipment (UE) is provided. The method includes receiving, through Radio Resource Control (RRC) signaling from a Base Station (BS), an indication indicating a dormancy cell group having at least a first serving cell and a second serving cell; receiving, through Physical Layer (PHY) signaling from the BS, a signal associated with a specific Downlink Control Information (DCI) format indicating a dormant behavior applicable to all serving cells in the dormancy cell group, wherein the signal indicates the dormant behavior via a single bit; applying the dormant behavior to the first serving cell and the second serving cell when the signal indicates that the dormant behavior is to be activated; and not applying the dormant behavior to the first serving cell and the second serving cell when the signal indicates that the dormant behavior is to be deactivated.

In an implementation of the third aspect, the method also includes receiving, from the BS, a wake up signal indicating the dormant behavior of the dormancy cell group, the wake up signal further including power saving information; applying the dormant behavior to the first serving cell and the second serving cell when the wake up signal indicates that the dormant behavior of the dormancy cell group is to be activated; and not applying the dormant behavior to the first serving cell and the second serving cell when the wake up signal indicates that the dormant behavior of the dormancy cell group is to be deactivated.

In another implementation of the third aspect, the power saving information includes a physical downlink control channel (PDCCH) monitoring behavior within an on-duration time of a Discontinuous Reception (DRX) mechanism.

In another implementation of the third aspect, the wake up signal indicates the dormant behavior applicable to all serving cells in the dormancy cell group via a single bit.

In another implementation of the third aspect, the dormant behavior further includes at least one of performing Channel State Information (CSI) measurement, performing Automatic Gain Control (AGC), and performing beam management.

In another implementation of the third aspect, the dormant behavior applicable to the first serving cell is applied on an active Bandwidth Part (BWP) of the first serving cell when the first serving cell is activated.

In another implementation of the third aspect, the dormancy cell group includes only serving cells that are Secondary Cells (SCells).

In another implementation of the third aspect, the indication indicates, to the UE, a serving cell of the plurality of serving cells belonging to the dormancy cell group via a cell index of the serving cell.

According to a fourth aspect of the present disclosure, a User Equipment (UE) that includes one or more non-transitory computer-readable media having computer-executable instructions embodied thereon; and at least one processor coupled to the one or more non-transitory computer-readable media is provided. The at least one processor is configured to execute the computer-executable instructions to cause the UE to: receive, through Radio Resource Control (RRC) signaling from a Base Station (BS), an indication indicating a dormancy cell group having at least a first serving cell and a second serving cell; receive, through Physical Layer (PHY) signaling from the BS, a signal associated with a specific Downlink Control Information (DCI) format indicating a dormant behavior applicable to all serving cells in the dormancy cell group, wherein the signal indicates the dormant behavior via a single bit; apply the dormant behavior to the first serving cell and the second serving cell when the signal indicates that the dormant behavior is to be activated; and not apply the dormant behavior to the first serving cell and the second serving cell when the signal indicates that the dormant behavior is to be deactivated.

In an implementation of the fourth aspect, the at least one processor is further configured to execute the computer-executable instructions to cause the UE to: receive, from the BS, a wake up signal indicating the dormant behavior of the dormancy cell group, the wake up signal further including power saving information; apply the dormant behavior to the first serving cell and the second serving cell when the wake up signal indicates that the dormant behavior of the dormancy cell group is to be activated; and not apply the dormant behavior to the first serving cell and the second serving cell when the wake up signal indicates that the dormant behavior of the dormancy cell group is to be deactivated.

In another implementation of the fourth aspect, the power saving information includes a physical downlink control channel (PDCCH) monitoring behavior within an on-duration time of a Discontinuous Reception (DRX) mechanism.

In another implementation of the fourth aspect, the wake up signal indicates the dormant behavior applicable to all serving cells in the dormancy cell group via a single bit.

In another implementation of the fourth aspect, the dormant behavior further includes at least one of performing Channel State Information (CSI) measurement, performing Automatic Gain Control (AGC), and performing beam management.

In another implementation of the fourth aspect, the dormant behavior applicable to the first serving cell is applied on an active Bandwidth Part (BWP) of the first serving cell when the first serving cell is activated.

In another implementation of the fourth aspect, the dormancy cell group includes only serving cells that are Secondary Cells (SCells).

In another implementation of the fourth aspect, the indication indicates, to the UE, a serving cell of the plurality of serving cells belonging to the dormancy cell group via a cell index of the serving cell.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DESCRIPTION

Figure 1:
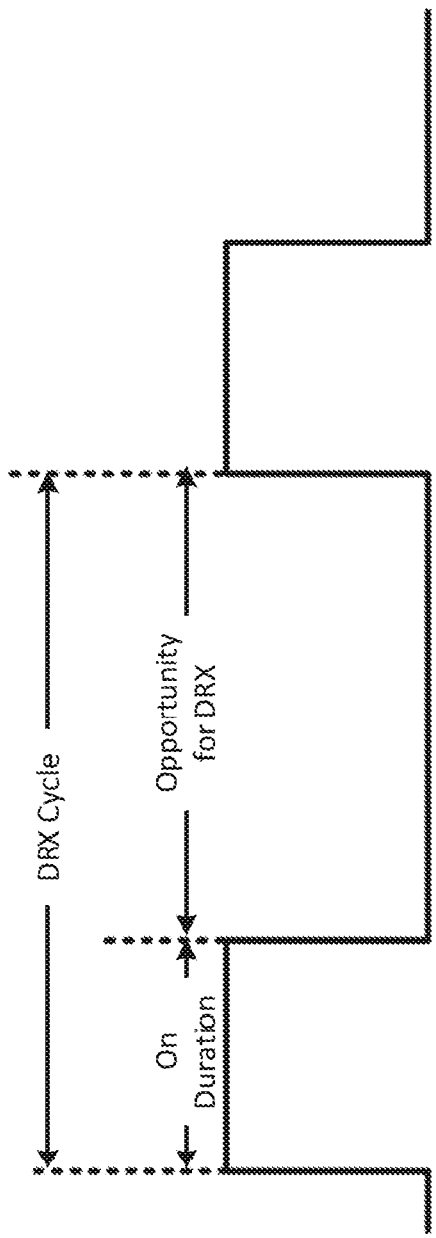
FIG. 1 is a diagram illustrating a DRX mechanism, in accordance with an implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-Advanced Pro system, or a 5G NR or NG-RAN typically includes at least one base station, at least one UE, and one or more optional network elements that provide connection towards a network. The UE communicates with the network (e.g., a CN), an evolved packet core (EPC) network, an Evolved Universal Terrestrial Radio Access network (E-UTRAN), a 5G Core (5GC), or an internet), through a radio access network (RAN) established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe) or Vehicle to Everything (V2X) service. Each cell may have overlapped coverage areas with other cells.

Any two or more than two of the previous, or following paragraphs, (sub)-bullets, points, actions, behaviors, terms, or claims described in the following invention(s) may be combined logically, reasonably, and properly to form a specific method.

Any sentence, paragraph, (sub)-bullet, point, action, behaviors, terms, or claims described in the following invention(s) may be implemented independently and separately to form a specific method.

Dependency, e.g., "based on", "more specifically", "preferably", "in one embodiment", or etc., as used herein reflects just one possible example which would not restrict a specific method.

A "PDCCH occasion" as discussed herein, refers to a time duration (i.e., one or a consecutive number of symbols) and/or a frequency location during which the UE is configured to monitor the PDCCH. More specifically, the "PDCCH occasion" may be configured via search space and/or Control Resource Set (CORESET).

A "Serving Cell" as discussed herein, refers to a Special Cell (SpCell), a Primary Cell (PCell), a Primary Secondary Cell (PSCell), or an SCell. The serving cell may be an activated or a deactivated serving cell.

A "Special Cell" (SpCell) as discussed herein, in the context of Dual Connectivity (DC) operation, refers to the PCell of the Master Cell Group (MCG) or the PSCell of the Secondary Cell Group (SCG) depending on if the MAC entity is associated to the MCG or the SCG, respectively. Otherwise the term Special Cell refers to the PCell. A Special Cell supports PUCCH transmission and contention-based Random Access, and is always activated.

Referring to FIG. 1, a DRX mechanism as discussed above is shown, including an On Duration period, in which a UE monitors PDCCH, and an Opportunity for DRX period, wherein the UE does not monitor PDCCH. The On Duration period and the Opportunity for DRX period collectively form a single DRX cycle.

APPROACH 1: Grouping of cells into a specific cell group and turning on/off (e.g., activating/deactivating) the dormant behavior (e.g., stop PDCCH monitoring, performing Channel State Information (CSI) measurement, performing Automatic Gain Control (AGC), and performing beam management) of the specific cell group.

Figure 2:
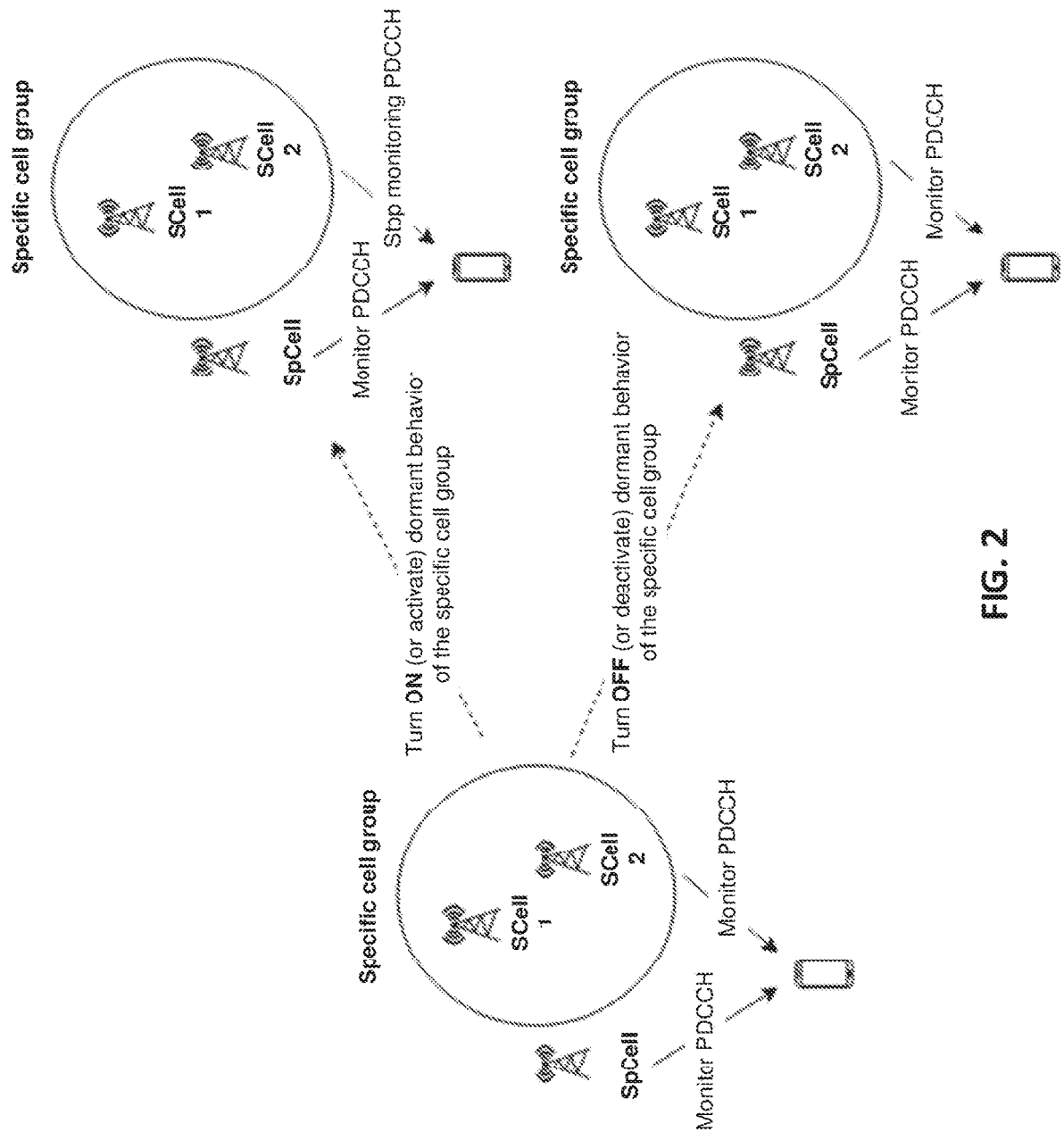
FIG. 2 is a schematic diagram illustrating a process of applying dormant behavior (e.g., PDCCH monitoring), in accordance with an implementation of the present disclosure.

Referring to FIG. 2 2, a UE may be configured with more than one serving cell (e.g., including an SpCell and/or at least one SCell). When the UE is in RRC_CONNECTED state, the UE may monitor PDCCH on the serving cell(s) (e.g., the serving cells which are configured with PDCCH configuration), e.g., when the UE is in DRX Active Time (e.g., if the UE is configured with DRX mechanism).

To reduce UE's battery consumption when monitoring PDCCH on the serving cells, one alternative is to group the serving cells into one or multiple specific cell groups. Then the UE can determine whether or not to apply dormant behavior (e.g., stop monitor the PDCCH) on the serving cell(s) of a specific cell group (e.g., per specific cell group basis) based on a specific indication and/or certain criteria. In other words, the dormant behavior (e.g., stop PDCCH monitoring) of the serving cells in the specific cell group could be turned ON (or activated) or OFF (or deactivated).

It should be noted that the dormant behavior (e.g., stop PDCCH monitoring) of each specific cell group may individually be turned ON/OFF either by gNB or the UE itself. If the dormant behavior of the specific cell group is turned ON, the UE may apply the dormant behavior (e.g., stop monitoring the PDCCH) on the serving cells in the specific cell group. Conversely, if the dormant behavior of the specific cell group is turned OFF (or deactivated), the UE may not apply dormant behavior (e.g., the UE may monitor the PDCCH) on the serving cells in the specific cell group. This approach may include two steps: grouping the serving cells into a specific cell group(s), and turning ON/OFF the dormant behavior (e.g., stop PDCCH monitoring) of the specific cell group(s) based on a specific indication and/or certain criteria as illustrated in FIG. 2.

Methods for Grouping the Serving Cells into a Specific Cell Group(s)

A NW may indicate whether a serving cell(s) belongs to a specific cell group (or identify which cell group the serving cell(s) belongs to) via a first indication, wherein the dormant behavior (e.g., stop PDCCH monitoring) of serving cells in the specific group could be turned ON or OFF. Preferably, the UE may need to (always) monitor PDCCH of the serving cells which do not belong to the specific cell group. The first indication may be RRC signaling, MAC signaling (e.g., MAC CE), PHY signaling (e.g., DCI), a specific signaling for power saving purpose (e.g., wake-up signaling, go-to-sleep signaling, PDCCH skipping, etc.).

In a first implementation, the NW may (explicitly) group the serving cells into a specific cell group via RRC configuration, e.g., the information for grouping the serving cells may be included in MAC-CellGroupConfig, CellGroupConfig, PhysicalCellGroupConfig, drx-Config, servingCellConfig, servingCellConfigCommon PDCCH-ServingCellConfig, BWP-Downlink, PDCCH-config Information Element (IE) according to the 3GPP (RRC) protocol specification, etc. In one example, the NW may use a flag to indicate whether the corresponding serving cell is related to a specific cell group. In another example, NW may indicate the serving cell is related to which group (e.g., via a cell index). For example, NW may indicate a specific cell group index, and indicate the serving cells associated with the specific cell group index.

In a second implementation, at most one specific cell group may be configured by the gNB within an MCG/SCG (e.g., associated with one MAC entity) or within a UE. Hence, without indicating the specific cell group index, the first indication may only indicate whether each of the serving cell(s) (or serving SCell(s)) belongs to the specific cell group or not. Alternatively, the UE may receive the indication for a serving cell only when the serving cell belongs to the specific cell group. For example, a PDCCH monitor group (PMG) indicator IE may be introduced in the RRC layer. Once a PMG IE was contained in the RRC configuration, IE specific for a serving cell (i.e., servingCell Config), it implies the indicated serving cell belonged to the specific cell group. Conversely, when a PMG IE was not contained in the RRC configuration IE specific for a serving cell (i.e., servingCellConfig), it implies the indicated serving cell did not belong to the specific cell group. The UE may receive a configuration IE to indicate which cell(s), for example, via cell index (e.g., ServCellIndex) belongs to the specific cell group.

In a third implementation, if a MAC entity (or an MCG/SCG) is configured/supported with multiple DRX configurations, each DRX configuration may be associated with one specific cell group. For example, the UE may need to determine whether to monitor PDCCH on (all) the (activated) serving cells in a first cell group based on a first DRX configuration. The UE may need to determine whether to monitor PDCCH on (all) the (activated) serving cells in a second cell group based on a second DRX configuration. A NW may indicate which cell(s), for example, via cell index (e.g., ServCellIndex) belongs to which DRX configuration via an indication. For example, the NW may indicate the cell index(s) in the DRX configuration. And, for example, the NW may indicate an index of a DRX configuration in the configuration of the serving cell.

In a fourth implementation, the serving cells may be implicitly grouped into a specific cell group.

In one example of the fourth alternative implementation, the cell group to which the serving cell belongs may be based on the active BWP of the serving cell. For example, if the active BWP of a first serving cell is initial or default BWP or a specific BWP, the first serving cell may belong to a first cell group. If the active BWP of a second serving cell is not initial or default or a specific BWP, the second serving cell may belong to a second cell group. If the active BWP of a first serving cell is a narrow BWP (i.e., the bandwidth is lower than a threshold), the first serving cell may belong to a first cell group. If the active BWP of a second serving cell is a wide BWP (i.e., the bandwidth is larger than a threshold), the second serving cell may belong to a second cell group. It should be noted that the threshold is configured by the gNB via DL RRC message and may, but is not limited to, be per serving cell or serving cell group configured.

In another example of the fourth alternative implementation, the cell group to which the serving cell belongs may be based on the cell index. For example, if the cell index of a first serving cell is higher than a threshold, the first serving cell may belong to a first cell group. If the cell index of a second serving cell is lower than a threshold, the second serving cell may belong to a second cell group. More specifically: the threshold may be indicated in a configuration which groups serving cell(s) into a specific cell group, the threshold may be indicated in DRX configuration, the threshold may be used to indicate the UE should monitor PDCCH on which cell(s) during DRX Active time, and the threshold may be predefined in specification. It should be noted that the threshold is configured by the gNB via DL RRC message and may be, but is not limited to, being either per serving cell, or serving cell group configured.

In another example of the fourth alternative implementation, the cell group to which the serving cell belongs may be based on the type (e.g., SpCell, PCell, PSCell, SCell). For example, if a first serving cell is the PCell, the first serving cell may belong to a first cell group. If a second serving cell is a SCell, the second serving cell may belong to a second cell group.

In another example of the fourth alternative implementation, the group to which the serving cell belongs may be based on the characteristics of the serving cell (e.g., cells in FR1 or FR2. The frequency bands may be designated for different frequency ranges (FR) and 3GPP Release 15 defined them as "FR1" and "FR2"). For example, if a first serving cell is located in a first frequency range, the first serving cell may belong to a first cell group. If a second serving cell is located in a second frequency range, the second serving cell may belong to a second cell group.

In all of these implementations for grouping the serving cells into a specific cell group(s), the serving cells may, but are not limited to being grouped based on one of the following examples: In one example SpCell may be a first group, and the other SCells may be a second group. In another example, SpCell may be a first group, some SCells may be a second group, and the remaining SCells may be a third group. And in another example, some SCells may be a first group, and the other SCells may be a second group (e.g., SCells in FR1 may be a first group and SCells in FR2 may be a second group).

Methods for Turning ON/OFF Dormant Behavior (e.g., Stop PDCCH Monitoring) of the Specific Cell Group When the status of the dormant behavior (e.g., stop PDCCH monitoring) of the specific cell group is ON (or activated), the UE may stop monitoring PDCCH of (all) the (activated) serving cells in the specific cell group. When the status of the dormant behavior (e.g., stop PDCCH monitoring) of the specific cell group is OFF, the UE may need to monitor PDCCH of (all) the (activated) serving cells in the specific cell group. Preferably, the status of the dormant behavior (e.g., stop PDCCH monitoring) of the serving cell in the specific cell group may imply whether the UE has to monitor the PDCCH on the serving cells in the specific cell group, e.g., when the UE is in DRX Active time (or DRX on duration), if the DRX is configured.

In a first implementation, an initial state (ON/OFF) of the dormant behavior (e.g., stop PDCCH monitoring) of a specific cell group may be configured by the NW or predefined in specification. When a serving cell is activated (from SCell deactivated state) and hasn't received the second indication for turning ON/OFF dormant behavior of the specific cell group, the UE may determine whether to apply dormant behavior (e.g., stop monitoring PDCCH) on the serving cell based on the initial state. When the UE is reconfigured by NW for the specific cell group, the UE may determine whether to apply dormant behavior (e.g., stop monitoring PDCCH) on the serving cells in the specific cell group based on the initial state.

In one example of the first implementation, the initial state of the dormant behavior (e.g., stop PDCCH monitoring) of a specific cell group may be ON. If a serving cell associated with the specific cell group is activated, e.g., via SCell Activation/Deactivation MAC CE, and hasn't received the second indication, the UE may stop monitoring the PDCCH on the serving cell.

In another example of the first implementation, the initial state of the dormant behavior (e.g., stop PDCCH monitoring) of a specific cell group may be OFF. If a serving cell associated with the specific cell group is activated, e.g., via SCell Activation/Deactivation MAC CE, and hasn't received the second indication, the UE may monitor the PDCCH on the serving cell.

In a second implementation, the NW may indicate whether the status of the dormant behavior (e.g., stop PDCCH monitoring) of the specific cell group is ON/OFF via a second indication. The second indication may be RRC signaling, MAC signaling (e.g., MAC CE), PHY signaling (e.g., DCI), and/or a specific L1 signaling. It should be noted that the L1 signaling may be but is not limited to be for a power saving purpose (e.g., WUS, go-to-sleep signaling, PDCCH skipping, etc.). The second indication may indicate whether the UE should apply dormant behavior (e.g., stop monitoring PDCCH) on the serving cells of a specific cell group and/or each of specific cell groups. The second indication may indicate which specific cell group should apply dormant behavior (e.g., stop monitoring PDCCH).

When the UE receives the second indication, the UE may determine whether to apply dormant behavior (e.g., stop monitoring PDCCH) on the serving cells of a specific cell group based on the (subheader/LCID/payload/format of the) second indication. The second indication may control the UE's dormant behavior (e.g., stop PDCCH monitoring behavior) for a period of time (e.g., a on duration(s), a DRX cycle(s), a duration of a (drx corresponding) timer, etc.) or until the UE receives another second indication to override the current status (e.g., ON/OFF) of dormant behavior (e.g., stop PDCCH monitoring). It should be noted that the second indication may control the UE's dormant behavior (e.g., stop PDCCH monitoring behavior) for a period of time and that the length of the time may be predefined in specification or preconfigured by the gNB (on per specific cell group/CG (MAC entity) basis).

In one example of the second alternative implementation, a WUS (or a specific signaling for a power saving purpose) may be indicated at an offset (time) before the on duration of a DRX cycle. When the UE receives the WUS, the UE may determine whether or not to apply the dormant behavior (e.g., stop monitoring the PDCCH) on the serving cells of the specific cell group (e.g., during the following DRX ON Duration and/or DRX cycle) based on the information included in the WUS. For example, the WUS may include a field to indicate this information. For another example, the WUS may indicate this information based on a specific WUS configuration. For example, the WUS may indicate this information based on an implicit method.

When the UE receives the WUS on a specific time/frequency occasion (e.g., a specific BWP, CORESET, and/or search space, etc.), the UE may need to apply dormant behavior (e.g., stop monitoring the PDCCH) of the specific cell group. Preferably, a different time/frequency occasion of the WUS may imply a different status of dormant behavior.

In another example of the second implementation, a DCI (with a specific DCI format) may indicate whether the UE should apply dormant behavior (e.g., stop monitoring PDCCH) on the serving cells of the specific cell group based on explicit or implicit ways. For example, the DCI may include a field to indicate this information. For another example, the DCI may indicate this information based on a specific RNTI. For another example, the DCI may indicate this information based on a specific DCI format. For another example, the DCI may indicate this information based on a specific search space/CORESET, e.g., the UE receives the DCI on the specific search space/CORESET may mean the UE should/should not monitor the PDCCH of the specific cell group. For another example, the DCI may indicate this information based on a specific DL BWP.

In another example of the second implementation, a specific indication may include a field to indicate ON/OFF status of the dormant behavior of the SCell with SCellIndex I (e.g., based on a bitmap). More specifically, the specific indication may include information from the SCell (e.g., via an index on the SCell) and/or the ON/OFF status of dormant behavior of the SCell. Alternatively, the specific indication may indicate ON/OFF status of the dormant behavior of the specific cell group. More specifically, the specific indication may include an information of the specific cell group (e.g., via an index of the specific cell group) and/or the ON/OFF status of the specific cell group (e.g., based on a bitmap).

In the second alternative implementation, the second indication may be configured/indicated/transmitted on SpCell only. Also, the second indication may be configured/indicated/transmitted on one or on multiple cells. In one example, if the UE receives the second indication on a first cell, the UE my turn ON/OFF the dormant behavior (e.g., stop PDCCH monitoring) of a cell group included the first cell. The UE may not turn ON/OFF the PDCCH monitoring of a cell group not included the first cell. In another example, if the UE receives the second indication on a first cell, the UE my turn ON/OFF the dormant behavior (e.g., stop PDCCH monitoring) of a cell group not included the first cell.

In a third implementation, whether the status of the dormant behavior (e.g., stop PDCCH monitoring) of the cell group is ON/OFF may be based on some implicit ways.

In one example of the third implementation, the type of DRX cycle may be used to determine the status of the dormant behavior (e.g., stop PDCCH monitoring) of the specific cell group. The type of DRX cycle may be short DRX cycle and/or long DRX cycle. Preferably, when the type of DRX cycle is changed (e.g., when receiving the DRX command MAC CE), the UE may need to change the status of dormant behavior (e.g., stop PDCCH monitoring) of the specific cell group.

If the specific serving cell(s) (which belongs to a specific serving cell group) is activated, the UE may need to apply dormant behavior (e.g., stop monitoring the PDCCH) on the serving cells of the specific cell group. If the specific serving cell(s) (which belongs to a specific serving cell group) is deactivated, the UE may not need to apply dormant behavior (e.g., stop monitoring the PDCCH) on the serving cells of the specific cell group.

APPROACH 2: PDCCH Monitoring of the Specific Cell Group Based on a Specific Timer.

In order to reduce PDCCH monitoring on some serving cells, a specific timer may be used to control the PDCCH monitoring of the serving cells and/or a specific cell group. The specific timer may be used per serving cell and/or per cell group.

For example, when the specific timer is running, the UE may perform one or more than one of the following behaviors: 1) monitoring PDCCH on a serving cell(s) or serving cells in a specific cell group; 2) monitoring PDCCH for a serving cell(s) or serving cells in a specific cell group; 3) SRS transmission on a serving cell(s) or serving cells in a specific cell group; 4) CSI reporting for a serving cell(s) or serving cells in a specific cell group; 5) PUCCH transmission on a serving cell(s) or serving cells in a specific cell group, if configured.

When the specific timer is not running (or when the specific timer expires), the UE may perform one or more than one of the following behaviors: 1) not monitoring PDCCH on a serving cell(s) or serving cells in a specific cell group; 2) monitoring PDCCH for a serving cell(s) or serving cells in a specific cell group; 3) SRS transmission on a serving cell(s) or serving cells in a specific cell group; 4) CSI reporting for a serving cell(s) or serving cells in a specific cell group; 5) PUCCH transmission on a serving cell(s) or serving cells in a specific cell group, if configured.

Since the UE may not always need to monitor PDCCH on the serving cell(s) or the serving cells in the specific cell group when the UE is in DRX Active Time (e.g., when drx-ondurationTimer is running), the UE could save power accordingly. More specifically, the specific timer may be used to control only the PDCCH monitoring behavior of one or more SCell(s) or a specific cell group. For example, when the specific timer expires, the UE may not need to monitor PDCCH on a first cell group, but the UE may still need to monitor PDCCH on the second cell group. In one example, the duration of the specific timer may be shorter than drx-ondurationTimer and/or shorter than drx-inactivity-Timer. In another example, the duration of the specific timer may be longer than drx-ondurationTimer and/or longer than drx-inactivityTimer.

The specific timer may be configured per UE, per MAC entity, per cell group, per cell, and/or per BWP. More specifically, the specific timer is configured per UE, per MAC entity, per cell group, per cell, and/or per BWP may imply that a value/parameter for the specific timer is configured per UE, per MAC entity, per cell group, per cell, and/or per BWP. For example, if the specific timer is configured per UE, the specific timer may be used to control the PDCCH monitoring of all the (activated) SCell(s) for the UE. Alternatively, if the specific timer is configured per MAC entity, the specific timer may be used to control the PDCCH monitoring of all the SCell(s) associated with the corresponding MAC entity. Alternatively, if the specific timer is configured per cell group, the specific timer may be used to control the PDCCH monitoring of the SCells in the specific cell group. More specifically, the configuration of the specific timer may be included in the configuration of DRX. Alternatively, the configuration of the specific timer may be included in the configuration of the serving cell. More specifically, control the PDCCH monitoring means whether to monitor or not to monitor the PDCCH.

The specific timer may be started or restarted when one or more than one of the followings happens: 1) when the UE receives the WUS (and the WUS indicates the UE to wake up, e.g., to monitor PDCCH on the following on duration) on the WUS occasion 2) when the UE starts or restarts drx-onduration timer (and/or on the starting symbol/slot of a DRX cycle); 3) when the UE starts or restarts drx-inactivity timer; 4) when the UE starts or restarts drx-retransmission-TimerDL and/or drx-retransmissionTimerUL; 5) when the UE receives a PDCCH indicates a new transmission (DL or UL), e.g., on/for the serving cell or the specific cell group; 6) when the UE transmits the SR on the corresponding serving cell; 7) when the UE transmits the BFR-SR on the corresponding serving cell.

The specific timer may be stopped when one or more than one of the followings happens: 1) when the UE does not receive the WUS on the WUS occasion; 2) when the UE receives the WUS on WUS occasion and the WUS indicates the UE not to wake up (e.g., ask the UE to go to sleep); 3) when the UE receives (Long) DRX command MAC CE; 4) when the UE stops drx-onduration timer; 5) when the UE stops drx-inactivity timer.

The unit of the specific timer may be one of the followings: 1) value in number of symbols of the BWP; 2) value in multiple integers of 1 ms; 3) value in multiples of 1/32 ms (sub milliseconds) or in ms (milliseconds); 4) value in number of slot lengths of the BWP; 5) value in multiples of the length of DRX cycle.

In further explanation of the various implementations discussed above, the following descriptions further elaborate the aforementioned method:

The UE monitoring the PDCCH on the serving cell may imply the UE monitors the PDCCH on PDCCH occasion on the serving cell. More specifically, the serving cell may be an activated serving cell.

The UE monitoring the PDCCH of the (specific) cell group may imply the UE monitors one or more or all serving cells in the (specific) cell group. The UE applying dormant behavior on the (specific) cell group may imply the UE applies one or more or all serving cells in the (specific) cell group.

The status (ON/OFF) of the dormant behavior may determine whether the UE should monitor the PDCCH. For example, if the status is OFF, the UE may need to monitor the PDCCH. When the status is ON, the UE may not need to monitor the PDCCH.

The status (ON/OFF) of the PDCCH monitoring mentioned in the present disclosure may imply whether the UE should apply or perform a dormancy behavior on an activated SCell(s). For example, when the status is ON, the UE may apply dormant behavior on the activated SCell(s). For another example, when the status is OFF, the UE may not apply dormant behavior on the activated SCell(s). The dormant behavior may be a solution for fast return to SCell utilization for data transfer. The dormant behavior may imply that the UE stops monitoring PDCCH but continues other activities such as CSI measurements, AGC and beam management.

When the UE receives the WUS may imply the NW indicates the UE to wake up (e.g., to monitor the PDCCH on the following on duration or start drx-ondurationtimer). When the UE does not receive the WUS on WUS occasion, it may imply the NW indicates the UE to go to sleep (e.g., not to monitor the PDCCH on the following on duration).

The MAC entity may be referred to UE. The UE may be referred to MAC entity.

The cell group may be a set of serving cells in an MCG or in a SCG, e.g., the serving cells may be associated with the same MAC entity. Each MCG/SCG may have one or more than one cell groups. The cell group may be a specific cell group for dormant behavior.

The NW may be a TRP, a cell, an eNB, a gNB, and/or a base station.

For the purpose of power saving, wake up (active) or sleep (inactive) state of UE could be controlled by DRX mechanism. When the UE stays in wake up state (or DRX active time), the UE may ramp up power to monitor PDCCH transmission continuously. On the contrary, when the UE is in sleep state (or DRX inactive time), the UE may not need to monitor PDCCH for power saving.

Figure 3:
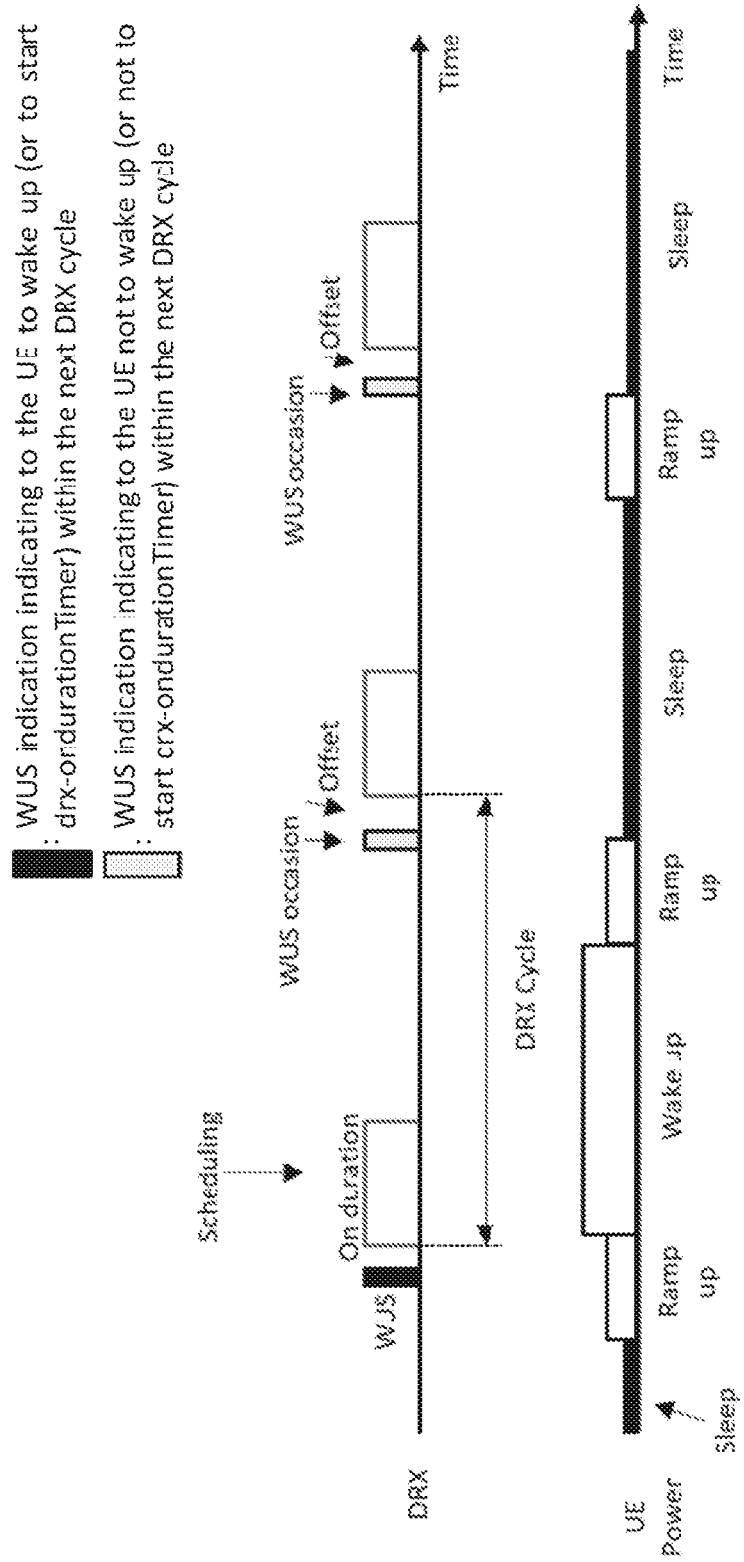
FIG. 3 is a diagram illustrating an example Wake-Up Signal (WUS) mechanism, in accordance with an implementation of the present disclosure.

Referring to FIG. 3, a WUS mechanism is illustrated in accordance with one implementation of the present disclosure. The upper part is a timeline for a WUS occasion and DRX mechanism (e.g., DRX cycle, DRX on duration time, DRX active time), and the lower part is the condition of UE power and/or level of UE power consumption. A WUS occasion, which may be a time and/or frequency resource for WUS monitoring, may be pre-configured, by gNB, an offset before the DRX on duration time. In the illustration, the first WUS indication is shaded in black, which means the WUS indicates to the UE to wake up (or to start drx-onduration-Timer) within the next DRX cycle. The subsequent WUS indication shaded in gray means the WUS(s) indicate to the UE not to wake up (or not to start the drx-ondurationTimer) within the next DRX cycle.

For example, the UE may ramp up the power to monitor WUS on a WUS occasion. Preferably, the time of the WUS occasion may be inside or outside DRX active Time. Preferably, the time that UE ramps up the power to monitor the WUS occasion may be not referred to DRX active time or inactive time, e.g., it may be a specific state which power consumption is lower than DRX active time.

If the UE receives a WUS signal on a WUS occasion, the UE may spend a predetermined time to decode the WUS signal, and then wake up to monitor the PDCCH on the upcoming (or next) on duration time of the DRX cycle (e.g., if the WUS indicates the UE to wake up). On the other hand, if the UE does not receive the WUS signal (e.g., or if the WUS indicates the UE not to wake up) on the WUS occasion, the UE could switch to the (micro) sleep state, i.e., no need to wake up to monitor the PDDCH for a period (until the next WUS occasion/on duration).

SCell Beam Failure Recovery (BFR)

The SCell BFR may include one or more than one of the following steps:

Beam failure detection (BFD): BFD RS (e.g., SSB and/or CSI-RS) may be explicitly or implicitly configured for a UE to detect beam failure. When beam failure (of SCell(s)) is detected, the UE may trigger a BFR procedure for SCell(s) and/or a dedicated SR-like PUCCH resource for BFRQ (which would be referred to BFR-SR (procedure) in this document).

New beam identification (NBI): A UE may select a new beam (or candidate beam) for a serving cell(s) based on measuring NBI RS (e.g., the L1-RSRP measurement result is higher than a threshold).

Beam failure recovery request (BFRQ): (First step) A UE may send a BFR-SR over PCell, PSCell, and/or SCell, wherein the BFR-SR may be used to inform a beam failure event of an CC (s) and/or to request an UL resource (to transmit more information of beam failure). It should be noted that whether the first step should be performed may be based on whether or not any UL resource is available. The details are described below. (Second step) the UE may send a BFR report (e.g., based on MAC CE), wherein the BFR report may include the failed CC(s) information (e.g., Cell index), new beam(s) information (e.g., the new beam may be selected based on measuring NBI RS), and/or no new beam information (e.g., no new beam with L1-RSRP higher than a threshold). The BFR report may be transmitted (only) via the UL grant which is requested by BFR-SR. Additionally, the BFR report may be transmitted via any UL grant (e.g., UL grant via RAR, dynamic UL grant via PDCCH, and/or configured grant).

Beam failure recovery response (BFR response): After transmitting the BFRQ (e.g., BFR-SR and/or BFR report), the UE may attempt to monitor a BFR response (e.g., via PDCCH monitoring) from the NW. BFR response may be transmitted on PCell, PSCell and/or SCell. The BFR response may be transmitted on an CC, wherein the UE transmits the BFRQ on the CC. Upon receiving the BFR response, the UE may consider the BFR procedure is completed.

BFR-SR: The BFR-SR may be a first step of the BFRQ. The BFR-SR may be a dedicated SR-like PUCCH resource for BFR. The BFR-SR may be used to inform the NW of a beam failure event and/or used for requesting UL-SCH resource for BFR report transmission. The UL resource required by BFR-SR may (only) be used for BFR (report transmission). The UE may be configured with zero, one, or more BFR-SR configuration.

The PUCCH resource for BFR-SR may be configured per BWP, per TRP, per CC, per set of CCs, per CG, and/or per UE. The PUCCH resource for BFR-SR may be configured on PCell, PSCell, and/or (PUCCH) SCell. The BFR-SR may be transmitted on PCell, PSCell, and/or SCell accordingly. The BFR-SR may be a cross-cell transmission, e.g., the beam failure happens on an SCell, but the BFR-SR is transmitted on PCell. The BFR-SR configuration may be a specific configuration which is not one of the SR configurations (e.g., the ID of BFR-SR configuration is not shared with schedulingRequestid).

Alternatively, the BFR-SR configuration may be one of the SR configurations (e.g., the ID of BFR-SR configuration is shared with schedulingRequestid [3]). The BFR-SR may be a highest priority of the SR configuration. The BFR-SR configuration may be configured per BWP, per TRP, per CC, per set of CCs, per CG, and/or per UE.

Figure 4:
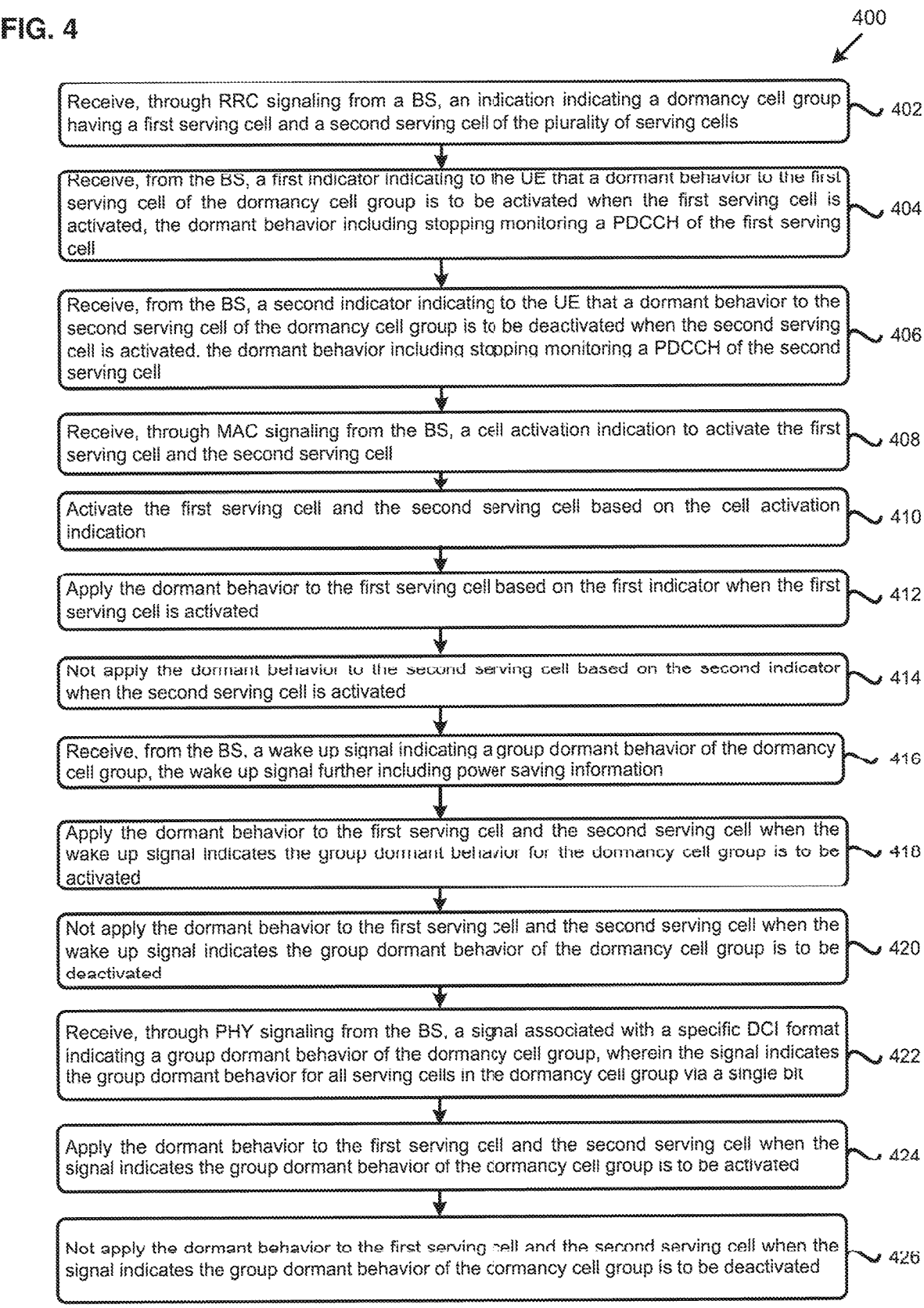
FIG. 4 is a flowchart illustrating an example method for a UE configured with a plurality of serving cells to apply or stop applying dormant behavior to one or more serving cells of a dormancy cell group, in accordance with one example implementation of the present disclosure.

Referring now to FIG. 4, FIG. 4 is a flowchart 400 illustrating an example method for a UE configured with a plurality of serving cells to apply or stop applying dormant behavior to one or more serving cells (of a dormancy cell group) in accordance with one example implementation of the present disclosure.

Action 402 includes receiving, through RRC signaling from a BS, an indication indicating a dormancy cell group having a first serving cell and a second serving cell of the plurality of serving cells. In one implementation, the dormancy cell group includes only serving cells that are Secondary Cells (SCells). In one implementation, the indication indicates a serving cell of the plurality of serving cells belonging to the dormancy cell group to the UE via a cell index of the serving cell.

Action 404 includes receiving, from the BS, a first indicator indicating to the UE that a dormant behavior to the first serving cell of the dormancy cell group is to be activated when the first serving cell is activated. The dormant behavior may include stopping monitoring a PDCCH of the first serving cell. The dormant behavior may further include at least one of performing channel state information measurement, performing automatic gain control, and performing beam management. In one implementation, the first indicator indicates an initial dormant behavior to be activated or deactivated when the first serving cell is activated.

Action 406 includes receiving, from the BS, a second indicator indicating to the UE that a dormant behavior to the second serving cell of the dormancy cell group is to be deactivated when the second serving cell is activated, the dormant behavior including stopping monitoring a PDCCH of the second serving cell. In one implementation, the second indicator indicates an initial dormant behavior to be activated or deactivated when the second serving cell is activated.

Action 408 includes receiving, through MAC signaling from the BS, a cell activation indication to activate the first serving cell and the second serving cell. In one implementation, the ell activation indication is a SCell Activation/Deactivation MAC CE.

Action 410 includes activating the first serving cell and the second serving cell based on the cell activation indication.

Action 412 includes applying the dormant behavior to the first serving cell based on the first indicator when the first serving cell is activated. In one implementation, the dormant behavior to the first serving cell is applied on an active BWP of the first serving cell when the first serving cell is activated.

Action 414 includes not applying the dormant behavior to the second serving cell based on the second indicator when the second serving cell is activated.

Action 416 includes receiving, from the BS, a wake up signal indicating a group dormant behavior of the dormancy cell group, the wake up signal further including power saving information. The power saving information may include a PDCCH monitoring behavior within an on-duration time of a DRX mechanism.

Action 418 includes applying the dormant behavior to the first serving cell and the second serving cell when the wake up signal indicates the group dormant behavior for the dormancy cell group is to be activated.

Action 420 includes not applying the dormant behavior to the first serving cell and the second serving cell when the wake up signal indicates the group dormant behavior of the dormancy cell group is to be deactivated.

Action 422 includes receiving, through Physical Layer (PHY) signaling from the BS, a signal associated with a specific Downlink Control Information (DCI) format indicating a group dormant behavior of the dormancy cell group, wherein the signal indicates the group dormant behavior for all serving cells in the dormancy cell group via a single bit.

Action 424 includes applying the dormant behavior to the first serving cell and the second serving cell when the signal indicates the group dormant behavior of the dormancy cell group is to be activated.

Action 426 includes not applying the dormant behavior to the first serving cell and the second serving cell when the signal indicates the group dormant behavior of the dormancy cell group is to be deactivated. In one implementation, actions 402 may be used to indicate a dormancy cell group(s) and the serving cells belonging to the dormancy cell group. In one implementation, actions 404 through 414 may be used to indicate an initial dormant behavior of the serving cell of the dormancy cell group. In one implementation, actions 416 through 426 may be used to indicate a dormant behavior of the dormancy cell group having one or more serving cells using a single bit.

Figure 5:
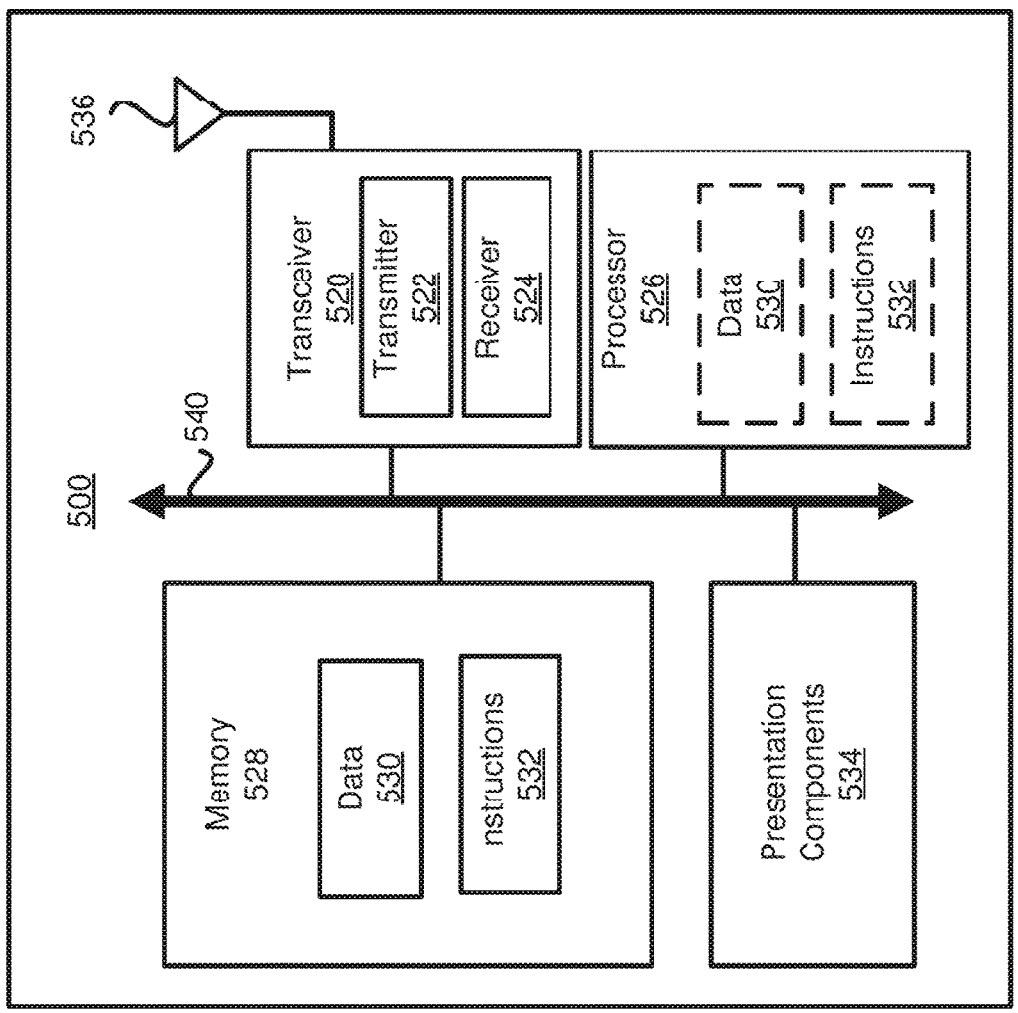
FIG. 5 is a block diagram illustrating a node for wireless communication, in accordance with one example implementation of the present disclosure.

Referring now to FIG. 5, FIG. 5 illustrates a block diagram of a node for wireless communication, in accordance with various aspects of the present disclosure. As illustrated in FIG. 5, a node 500 may include a transceiver 506, a processor 508, a memory 502, one or more presentation components 504, and at least one antenna 510. The node 500 may also include an RF spectrum band module, a BS communications module, a network communications module, and a system communications management module, Input/Output (I/O) ports, I/O components, and power supply (not explicitly illustrated in FIG. 5). Each of these components may be in communication with each other, directly or indirectly, over one or more buses 540. In one implementation, the node 500 may be a UE or a BS that performs various functions described herein, for example, with reference to FIGS. 1 through 4.

The transceiver 506 having a transmitter 516 (e.g., transmitting/transmission circuitry) and a receiver 518 (e.g., receiving/reception circuitry) may be configured to transmit and/or receive time and/or frequency resource partitioning information. In some implementations, the transceiver 506 may be configured to transmit in different types of subframes and slots including, but not limited to, usable, non-usable and flexibly usable subframes and slot formats. The transceiver 506 may be configured to receive data and control channels.

The node 500 may include a variety of computer-readable media. Computer-readable media can be any available media that can be accessed by the node 500 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules or other data in a modulated data signal such as a carrier wave or other transport mechanism and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, Radio Frequency (RF), infrared and other wireless media. Combinations of any of the above should also be included within the scope of computer-readable media.

The memory 502 may include computer-storage media in the form of volatile and/or non-volatile memory. The memory 502 may be removable, non-removable, or a combination thereof. For example, the memory 502 may include solid-state memory, hard drives, optical-disc drives, etc. As illustrated in FIG. 5, the memory 502 may store computer-readable and/or -executable instructions 514 (e.g., software codes) that are configured to, when executed, cause the processor 508 to perform various functions described herein, for example, with reference to FIGS. 1 through 4. Alternatively, the instructions 514 may not be directly executable by the processor 508 but may be configured to cause the node 500 (e.g., when compiled and executed) to perform various functions described herein.

The processor 508 (e.g., having processing circuitry) may include an intelligent hardware device, a Central Processing Unit (CPU), a microcontroller, an ASIC, etc. The processor 508 may include memory. The processor 508 may process the data 512 and the instructions 514 received from the memory 502, and information through the transceiver 506, the base band communications module, and/or the network communications module. The processor 508 may also process information to be sent to the transceiver 506 for transmission through the antenna 510, to the network communications module for transmission to a core network.

One or more presentation components 504 may present data indications to a person or other device. Examples of presentation components 504 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE), the method comprising:
   receiving, through Radio Resource Control (RRC) signaling, from a Base Station (BS), an indication indicating a dormancy cell group having at least a first serving cell and a second serving cell;
   receiving, through Physical Layer (PHY) signaling, from the BS, a signal associated with a specific Downlink Control Information (DCI) format indicating a dormant behavior applicable to all serving cells in the dormancy cell group, wherein the signal indicates the dormant behavior via a single bit;
   applying the dormant behavior to the first serving cell and the second serving cell when the signal indicates that the dormant behavior is to be activated; and
   forgoing applying the dormant behavior to the first serving cell and the second serving cell when the signal indicates that the dormant behavior is to be deactivated.

2. The method of claim 1, further comprising:
   receiving, from the BS, a wake up signal indicating the dormant behavior of the dormancy cell group, the wake up signal further including power saving information;
   applying the dormant behavior to the first serving cell and the second serving cell when the wake up signal indicates that the dormant behavior of the dormancy cell group is to be activated; and
   forgoing applying the dormant behavior to the first serving cell and the second serving cell when the wake up signal indicates that the dormant behavior of the dormancy cell group is to be deactivated.

3. The method of claim 2, wherein the power saving information includes a physical downlink control channel (PDCCH) monitoring behavior within an on-duration time of a Discontinuous Reception (DRX) mechanism.

4. The method of claim 2, wherein the wake up signal indicates the dormant behavior applicable to the all serving cells in the dormancy cell group via a single bit.

5. The method of claim 1, wherein the dormant behavior further includes at least one of performing Channel State Information (CSI) measurement, performing Automatic Gain Control (AGC), and performing beam management.

6. The method of claim 1, wherein the dormant behavior applicable to the first serving cell is applied on an active Bandwidth Part (BWP) of the first serving cell when the first serving cell is activated.

7. The method of claim 1, wherein the dormancy cell group includes only serving cells that are Secondary Cells (Scells).

8. The method of claim 1, wherein the indication indicates, to the UE, each serving cell of a plurality of serving cells that belongs to the dormancy cell group via a cell index of the serving cell.

9. A User Equipment (UE) comprising:
   one or more non-transitory computer-readable media storing one or more computer-executable instructions; and
   at least one processor coupled to the one or more non-transitory computer-readable media, and configured to execute the one or more computer-executable instructions to cause the UE to:
   receive, through Radio Resource Control (RRC) signaling from a Base Station (BS), an indication indicating a dormancy cell group having at least a first serving cell and a second serving cell;
   receive, through Physical Layer (PHY) signaling from the BS, a signal associated with a specific Downlink Control Information (DCI) format indicating a dormant behavior applicable to all serving cells in the dormancy cell group, wherein the signal indicates the dormant behavior via a single bit;
   apply the dormant behavior to the first serving cell and the second serving cell when the signal indicates that the dormant behavior is to be activated; and
   forgo applying the dormant behavior to the first serving cell and the second serving cell when the signal indicates that the dormant behavior is to be deactivated.

10. The UE of claim 9, wherein the at least one processor is further configured to execute the one or more computer-executable instructions to cause the UE to:
    receive, from the BS, a wake up signal indicating the dormant behavior of the dormancy cell group, the wake up signal further including power saving information;
    apply the dormant behavior to the first serving cell and the second serving cell when the wake up signal indicates that the dormant behavior of the dormancy cell group is to be activated; and
    forgo applying the dormant behavior to the first serving cell and the second serving cell when the wake up signal indicates that the dormant behavior of the dormancy cell group is to be deactivated.

11. The UE of claim 10, wherein the power saving information includes a physical downlink control channel (PDCCH) monitoring behavior within an on-duration time of a Discontinuous Reception (DRX) mechanism.

12. The UE of claim 10, wherein the wake up signal indicates the dormant behavior applicable to the all serving cells in the dormancy cell group via a single bit.

13. The UE of claim 9, wherein the dormant behavior further includes at least one of performing Channel State Information (CSI) measurement, performing Automatic Gain Control (AGC), and performing beam management.

14. The UE of claim 9, wherein the dormant behavior applicable to the first serving cell is applied on an active Bandwidth Part (BWP) of the first serving cell when the first serving cell is activated.

15. The UE of claim 9, wherein the dormancy cell group includes only serving cells that are Secondary Cells (SCells).

16. The UE of claim 9, wherein the indication indicates, to the UE, each serving cell of a plurality of serving cells that belongs to the dormancy cell group via a cell index of the serving cell.

* * * * *